United States Patent [19]

Herrmann

[11] Patent Number: 4,670,518

[45] Date of Patent: Jun. 2, 1987

[54] PROCESS FOR THE PRODUCTION OF LOW-MOLECULAR WEIGHT HOMO- AND/OR COPOLYMERS OF 1,3-DIENES CARRYING HYDROXYMETHYL GROUPS PARTIALLY ESTERIFIED WITH FORMIC ACID

[75] Inventor: Christoph Herrmann, Marl, Fed. Rep. of Germany

[73] Assignee: Huels Aktiengesellschaft, Marl, Fed. Rep. of Germany

[21] Appl. No.: 684,394

[22] Filed: Dec. 20, 1984

[30] Foreign Application Priority Data

Dec. 23, 1983 [DE] Fed. Rep. of Germany ....... 3346714

[51] Int. Cl.⁴ .............................................. C08F 8/00
[52] U.S. Cl. .............................. 515/332.8; 525/332.9; 525/333.1; 525/333.2; 525/383
[58] Field of Search ................. 525/383, 332.8, 332.9, 525/333.1, 333.2

[56] References Cited

U.S. PATENT DOCUMENTS

| | | | |
|---|---|---|---|
| 2,888,436 | 5/1959 | Pritchard | 525/154 |
| 3,076,779 | 2/1963 | Sernivk | 260/41.5 |
| 3,776,981 | 12/1973 | Winkler et al. | 525/339 |
| 4,542,191 | 9/1985 | Kay et al. | 525/383 |

FOREIGN PATENT DOCUMENTS

1072796 6/1967 United Kingdom .

*Primary Examiner*—Joseph L. Schofer
*Assistant Examiner*—Bernard Lipman
*Attorney, Agent, or Firm*—Millen & White

[57] ABSTRACT

A process for the production of low-molecular weight homo- and/or copolymers of 1,3-dienes carrying hydroxymethyl groups partially esterified with formic acid, comprises reacting homo- and/or copolymers of 1,3-dienes having an average molecular weight ($\overline{M}n$) of 500–8,000 with formaldehyde at temperatures of 150°–300° C. under a protective gas atmosphere and optionally in the presence of a solvent and a stabilizer.

16 Claims, No Drawings

PROCESS FOR THE PRODUCTION OF LOW-MOLECULAR WEIGHT HOMO- AND/OR COPOLYMERS OF 1,3-DIENES CARRYING HYDROXYMETHYL GROUPS PARTIALLY ESTERIFIED WITH FORMIC ACID

BACKGROUND OF THE INVENTION

This invention relates to a process for preparing hydroxymethylated homo- or co-polymers of 1,3-dienes.

Low-molecular weight homo- and copolymers of 1,3-dienes have been known for a long time. It is advantageous for many uses to alter the properties of the hydrophobic polymers in a controlled fashion by the introduction of polar groups. One of these groups is the hydroxy group because reactions with isocyanates, for example, can be carried out on such a group.

It has been conventional to form hydroxy groups in low-molecular weight homo- and copolymers of 1,3-dienes by hydrolysis of corresponding epoxy compounds, which can be obtained, for example, according to the process of German Pat. No. 1,173,658. Such a multistage process is, however, expensive and entails additional drawbacks due to the use of compounds that cannot be easily handled (formic acid, hydrogen peroxide).

It is furthermore known to introduce hydroxy groups in the form of hydroxymethyl groups into an unsaturated polymer by hydroformylation of the latter and subsequent hydrogenation of the formyl groups with metal carbonyls (British Pat. No. 1,072,796). Here again, a multistage process is involved wherein relatively expensive catalysts must be utilized.

SUMMARY OF THE INVENTION

Accordingly, it is an object of the present invention to develop a simple and economical process for the introduction of hydroxy groups into low-molecular weight homo- and copolymers.

Upon further study of the specification and appended claims, further objects and advantages of this invention will become apparent to those skilled in the art.

These objects have been achieved by providing a process for the production of low-molecular weight homo-and/or copolymers of 1,3-dienes which carry hydroxymethyl groups partially esterified with formic acid, comprising reacting homo- and/or copolymers of 1,3-dienes of an average molecular weight ($\overline{M}n$) of 500–8,000 with formaldehyde at temperatures of 150°–300° C. under a protective gas atmosphere and, optionally, in the presence of a solvent and a stabilizer.

DETAILED DISCUSSION OF THE INVENTION

In view of the requirements disclosed in U.S. Pat. No. 3,076,779, it is surprising that it is possible to chemically add formaldehyde to polydienes that are unsaturated to a high degree by means of a purely thermal reaction, i.e., with essentially no catalyst, e.g., Friedel Crafts catalyst, and thus to introduce hydroxy groups in the form of hydroxymethyl groups.

Homo- and copolymers of 1,3-dienes are understood to include, within the scope of this invention: homopolymers of, for example, $C_{4-6}$-dienes, e.g., 1,3-butadiene, isoprene, 2,3-dimethylbutadiene, piperylene, etc; copolymers of these 1,3-dienes with one another; as well as copolymers of these 1,3-dienes with $C_{8-10}$-vinyl-substituted aromatic compounds, such as, for example, styrene, α-methylstyrene, vinyltoluene, divinylbenzene, etc. The content of vinyl-substituted aromatic compounds in these copolymers is not to exceed 50 molar percent. Such products can be prepared in accordance with many conventional prior-art processes (for example, German Pat. No. 1,186,631; DAS 1,212,302; German Pat. No. 1,292,853; DOS 2,361,782; and DOS 2,342,885).

Besides the "genuine" copolymers formed by polymerization of 1,3-dienes with vinyl-substituted aromatic compounds, copolymers also included within the scope of this invention, are the reaction products of 1,3-dienes and aromatic hydrocarbons. These "false" copolymers involve arylated polyenes obtained by allowing a 1,3-diene above, e.g., 1,3-butadiene or piperylene, to react in the presence of a suitable catalyst in an aromatic solvent, such as for example, benzene or toluene (German Pat. Nos. 1,137,727 and 1,170,932; U.S. Pat. No. 3,373,216; Japanese Laid-Open Application 49-32985; DOS's 2,848,804 and 3,000,708).

Preferably, polybutadienes are employed having molecular weights ($Mn$) of 600–7,000, especially 800–6,000. The microstructure of the dienes in the homo-or copolymers is uncritical. However, if the products of the process are to be utilized in enviornments where a quick oxidative drying is demanded, then it is advantageous to make the contents of tne cis-1,4-double bonds maximally high (e.g.,70–98% of the double bonds).

The formaldehyde serving for the introduction of the hydroxymethyl groups can be present in oligomeric form e.g., (1,3,5-trioxane) and polymeric form (e.g., paraformaldehyde), as well as in an aqueous solution and/or suspension. Further details regarding production and properties of the various formaldehydes can be derived, for example, from the monograph by J. F. Walker, "Formaldehyde" 3rd ed. (1964). In general 10–200 g, preferably 30–150 g of formaldehyde (HCHO) is utilized per 100 g of the low-molecular weight homo- and/or copolymer of 1,3-dienes. The reactions are conducte in an autoclave at temperatures of 150°–300° C., preferabiy above 150° C., most preferably 170°–260° C.

Since the unsaturated polymers are sensitive to oxidation, it is expedient to effect all operations under an inert gas atmosphere, such as, for example, nitrogen or argon, and optionally also in the presence of a stabilizer.

Suitable stabilizers include those employed in the rubber-processing industry as anti-aging agents (see S. Bostrom, "Kautschuk-Handbuch" (Elastomer Manual) Vol. 4 (1961): 362–384). Typical representatives include 2,2'-methylenebis(4-methyl-6-tert-butylphenol), abbreviated BKF, and N-isopropyl-N'-phenyl-p-phenylenediamine. The stabilizers are generally used in an amount of 0.01–5% by weight, preferably 0.1–1% by weight, based on the amount of 1,3-diene homo- or copolymer.

The reaction between the 1,3-diene homo- or copolymer and formaldehyde can take place also in the presence of a solvent or a solvent can be omitted. The use of a solvent is advised, e.g., on the one hand, if the viscosity of the polymer is relatively high and on the other hand, if the solubility conditions can be favorably influenced thereby, e.g., if the reaction otherwise would encounter difficulties due to inadequate solubility of one or more reactants.

Suitable solvents include, for example, $C_{4-8}$-aliphatic, $C_{6-9}$-cyclo-aliphatic, and $C_{6-10}$-aromatic hydrocarbons.

Typical representatives from these groups include hexane, octane, cyclohexane, toluene, and xylene.

It is furthermore also possible to employ polar solvents, such as alcohols, ethers, esters, and ketones. Typical representatives of these groups include, for example, methanol, ethanol, propanols and butanols, diethylene glycol dimethyl ether, tetrahydrofuran (THF), methyl formate, ethyl acetate, acetone, methyl ethyl ketone, and methyl isopropyl ketone. The reaction can also be conducted in the presence of water.

Since the use of a solvent is not critical to the process, it is clear that the amount employed is certainly not critical. However, when used, the amounts generally are 50-200 wt. % based on the dienepolymer. The type and amount of a solvent are to be selected in each case fully conventionally from conventional considerations of process technique.

When conducting the process of this invention, the procedure generally is to provide the 1,3-diene homo- or copolymer, optionally together with one or several solvents and a stabilizer, in an autoclave under an inert gas atmosphere, and to heat the mixture to the desired temperature after adding the formaldehyde. The necessary reaction time depends on the type and quantity of polymer and the optionally employed solvent, as well as on the reaction temperature. In general, this time is 10 minutes to 10 hours. The optimum reaction period can be readily determined by a few orientation experiments where necessary.

The reaction can be terminated by cooling to room temperature (18°-25° C.). The mixture, optionally after first washing with, for example, ammoniacal water, is worked up by distillatory separation of the volatile components.

The functionalized oils obtained according to the process of this invention contain 0.2-15% by weight, preferably 0.5-8% by weight, of oxygen in the form of randomly distributed hydroxymethyl groups partially esterified with formic acid. The esterification is due to the fact that a portion of the formaldehyde employed is subject to disproportionation. The degree of esterification is dependent on the reaction conditions Insofar as the ester groups do not impede the purpose for which the reaction products are used they can remain therein. Otherwise, hydrolysis can be carried out by prior-art methods with a subsequent conventional working-up operation (Houben-Weyl, "Methoden der praeparativen organischen Chemie" (Methods of preparative Organic Chemistry) Alcohols I (1979): 262-273).

As mentioned above, the products according to the process of this invention can be reacted with isocyanates to obtain products of great versatility in technical usage, e.g., waterproof roofing, sealants and materials for electronic encapsulation Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

The microstructures of the polymers employed were determined by IR spectroscopy and represent the proportionate values of the double bonds. The iodine numbers (g iodine/100 g compound) were determined according to ASTM D2078; the viscosities (mPa s) were measured at 20° C. according to DIN 53 015. The hydroxy number (OH N) was determined according to DIN 53 240, the acid number (AN) according to DIN 53 402, the saponification number (SN) according to DIN 53 401. The values are indicated in mg KOH/g compound.

EXAMPLE 1

100 g of a polybutadiene oil having a viscosity (20° C.) of 780 mPa s and an iodine number of 445 g/100 g (microstructure: 74% cis-1,4- and 25% trans-1,4-content, $\overline{M}n=1,700$) was stabilized with 0.5 g of 2,2'-methylenebis(4-methyl-6-tert-butylphenol) (BKF) and maintained with 61 g of paraformaldehyde [$(HCHO)_n$] under an $N_2$ atmosphere in an autoclave under internal pressure and agitation for 4 hours at 225° C. The mixture was worked up by washing three times with respectively 150 ml of ammonia/water (~5% $NH_3$) and subsequent one-hour vacuum distillation at 140° C. The final product contained 5.66% oxygen (abbreviated as "O" below); the functional groups were characterized by an OH number of 42, an acid number of 0.51, and a saponification number of 44 mg KOH/g. The viscosity was 11,500 mPa s (20° C.), the iodine number was 423 g/100 g. The oil had a residual content of 380 ppm of formaldehyde (determined by gas chromatography [GC]).

EXAMPLES 2-6

Respectively 100 g of the polybutadiene oil used as the starting compound in Example 1 was functionalized with paraformaldehyde under the conditions indicated in Table 1 below. The reaction products were worked up as described in Example 1.

TABLE 1

| Ex. No. | $(HCHO)_n$ (g) | T (°C.) | t (h) | O (%) | OH-Number (mg KOH/g) | SN (mg KOH/g) |
|---|---|---|---|---|---|---|
| 2 | 15 | 200 | 4 | 3.43 | 35 | 22 |
| 3 | 30 | 200 | 4 | 3.82 | 40 | 33 |
| 4 | 61 | 200 | 4 | 4.46 | 28 | 48 |
| 5 | 61 | 250 | 2 | 5.49 | 48 | 41 |
| 6 | 61 | 250 | 0.25 | 7.19 | 42 | 72 |

EXAMPLE 7

100 g of the polybutadiene oil employed in Example 1 was dissolved in 150 g of toluene under a protective $N_2$ atmosphere and heated with 0.5 g of BKF and 61 g of paraformaldehyde in an autoclave under agitation for 4 hours to 200° C. The solvent and excess formaldehyde were then exhausted under an oil pump vacuum at 140° C. The final product had an O-content of 3.68%, an OH number of 40, and an SN of 27 mg KOH/g.

EXAMPLE 8

Example 7 was repeated except for the use of diethylene glycol diemethyl ether (diglyme) as the solvent. The final product had an O-content of 5.12%, an OH number of 44, and an SN of 41 mg KOH/g.

EXAMPLE 9

100 g of a polybutadiene oil with a viscosity of 3,160 mPa s (20° C.) and an iodine number of 445 g/100 g (microstructure: 76% cis-1,4- and 22% trans-1,4-content, $\overline{M}n=4,080$) was dissolved under $N_2$ atmosphere in 100 g of toluene and heated with 0.5 g of BKF and 30 g of paraformaldehyde in an autoclave under internal pressure and agitation for 4 hours to 200° C. After the mixture had been worked up analogously to Example 7, the product contained 3.84% O; the functional groups were characterized by an OH number of 35, an acid number of 0.52, and a saponification number of 59 mg KOH/g. The viscosity (20° C.) was 18,000 mPa s, and the iodine number was 414. The final product still contained 190 ppm of HCHO (GC).

EXAMPLES 10-13

Example 9 was repeated except for the use of different solvents under varying reaction conditions listed in Table 2.

TABLE 2

| Ex. No. | (HCHO)$_n$ (g) | Solvent | T (°C.) | t (h) | O (%) | OH N (mg KOH/g) | SN |
|---|---|---|---|---|---|---|---|
| 10 | 30 | Toluene | 220 | 4 | 3.56 | 31 | 39 |
| 11 | 30 | Hexane | 220 | 4 | 3.46 | 29 | 40 |
| 12 | 30 | THF | 220 | 4 | 2.74 | 26 | 28 |
| 13 | 30 | Diglyme | 200 | 4 | 2.71 | 29 | 27 |

EXAMPLES 14-17

In these examples, respectively 100 g polybutadiene oils of varying microstructure were reacted with paraformaldehyde analogously to the mode of operation in Example 1 under the conditions set forth in Table 3.

TABLE 3

| Ex. No. | Oil* | (HCHO)$_n$ (g) | T (°C.) | t (h) | O (%) | OH N (mg KOH/g) | SN |
|---|---|---|---|---|---|---|---|
| 14 | VPO | 20 | 180 | 4 | 3.58 | 20 | 26 |
| 15 | VPO | 61 | 200 | 4 | 5.48 | 34 | 45 |
| 16 | "LITHENE" AM | 61 | 200 | 4 | 3.86 | 39 | 36 |
| 17 | Nisso PB B-1000 | 47 | 200 | 4 | 4.26 | 30 | 27 |

*Characteristic data of oils

| | Double Bond Distribution | | | |
|---|---|---|---|---|
| | 1,2 % | cis-1,4 % | trans-1,4 % | $\overline{M}n$ |
| VPO = Vinyl-Polyoil huls | 33 | 49 | 14 | 1730 |
| "LITHENE"AM | 60 | — | 15 | 1300 |
| Nisso PB B-1000 | 87 | — | 13 | 1220 |

EXAMPLE 18

The procedure of Example 1 was repeated, with the change that 91 g of 1,3,5-trioxane was used instead of paraformaldehyde with 100 g of the polybutadiene oil described therein. The final product had an O-content of 4.1%, the OH number was 47, and the SN was 44 mg KOH/g.

EXAMPLES 19-23

These examples were conducted analogously to Example 1, except for using, with 100 g of the respective polybutadiene oil, a 50% by weight formaldehyde/water solution in place of paraformaldehyde. The product was worked up by separation of the aqueous phase and subsequent drying of the oil under a vacuum for one hour at 140° C.

TABLE 4

| Ex. No. | Polybutadiene Oil | HCHO in H$_2$O (g) | T (°C.) | t (h) | O (%) | OH N (mg KOH/g) | SN |
|---|---|---|---|---|---|---|---|
| 19 | from Ex. 1 | 61 | 200 | 4 | 1.37 | 20 | 9 |

TABLE 4-continued

| Ex. No. | Polybutadiene Oil | HCHO in H$_2$O (g) | T (°C.) | t (h) | O (%) | OH N (mg KOH/g) | SN |
|---|---|---|---|---|---|---|---|
| 20 | from Ex. 1 | 122 | 200 | 4 | 1.66 | 30 | 2 |
| 21 | from Ex. 1 | 122 | 250 | 0.25 | 2.17 | 36 | 10 |
| 22 | from Ex. 9 | 122 | 200 | 4 | 1.25 | 20 | 7 |
| 23 | from Ex. 9 | 61 | 225 | 4 | 1.41 | 22 | 9 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

We claim:

1. A process for the production of a low-molecular weight homo- or copolymer of a 1,3-diene containing 0.2-15% by weight of oxygen in the form of hydroxymethyl groups partially esterified with formic acid, said hydroxymethyl groups being attached directly to the polymer chain, comprising reacting the homo- or copolymer of a 1,3-diene having an average molecular weight (Mn) of 500-8,000 with an effective amount of formaldehyde at a temperature of 150°-300° C. under an inert gas atmosphere.

2. A process of claim 1, wherein the homo- or copolymer of a 1,3-diene has an average molecular weight ($\overline{M}n$) of 600-7,000.

3. A process of claim 1, wherein the homo- or copolymer of a 1,3-diene has an average molecular weight ($\overline{M}n$) of 800-6,000.

4. A process of claim 1, wherein the 1,3-diene is 1,3-butadiene.

5. A process of claim 1, wherein the reaction temperature is 170°-260° C.

6. A process of claim 1, wherein the 1,3-diene is isoprene, 2,3-dimethylbutadiene or piperylene.

7. A process of claim 4, wherein the polymer is a homopolymer.

8. A process of claim 6, wherein the polymer is a homopolymer.

9. A process of claim 1, wherein the polymer is a copolymer of a 1,3-diene with a vinyl substituted phenyl monomer.

10. A process of claim 1, wherein the amount of formaldehyde (HCHO) is 10-200 g per 100 g of 1,3-diene polymer.

11. A process of claim 1, wherein the inert gas atmosphere is nitrogen or argon.

12. A process of claim 1, wherein the reaction is conducted in the presence of an effective amount of a stabilizer compound which is an anti-aging agent for rubber.

13. A process of claim 12, wherein the stabilizer is 2,2'-methylenebis(4-methyl-6-tert-butylphenol) or N-isopropyl-N'-phenyl-p-phenylenediamine.

14. A process of claim 1, wherein the reaction is conducted in the presence of a reaction compatible solvent.

15. A process of claim 12, wherein the reaction is conducted in the presence of a reaction compatible solvent.

16. A low-molecular weight homo- or copolymer of a 1,3-diene carrying hydroxymethyl groups partially esterified with formic acid, prepared by the process of claim 1.

* * * * *